United States Patent
Knoll et al.

(10) Patent No.: US 11,248,080 B2
(45) Date of Patent: Feb. 15, 2022

(54) BROMINATED FLAME RETARDANT

(71) Applicant: BASF SE, Ludwigshafen am Rhein (DE)

(72) Inventors: Konrad Knoll, Ludwigshafen am Rhein (DE); Ingo Bellin, Ludwigshafen am Rhein (DE); Jan Holoch, Ludwigshafen am Rhein (DE); Eckhard Neufeld, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/613,832

(22) PCT Filed: May 16, 2018

(86) PCT No.: PCT/EP2018/062806
§ 371 (c)(1),
(2) Date: Nov. 15, 2019

(87) PCT Pub. No.: WO2018/210965
PCT Pub. Date: Nov. 22, 2018

(65) Prior Publication Data
US 2020/0165372 A1 May 28, 2020

(30) Foreign Application Priority Data
May 17, 2017 (EP) .................................. 17171490

(51) Int. Cl.
*C08G 83/00* (2006.01)
*C08F 297/04* (2006.01)
*C08J 9/14* (2006.01)
*C08J 9/20* (2006.01)
*C08J 9/232* (2006.01)
*C08L 53/00* (2006.01)
*C09K 21/14* (2006.01)

(52) U.S. Cl.
CPC ........ *C08F 297/044* (2013.01); *C08G 83/003* (2013.01); *C08J 9/141* (2013.01); *C08J 9/20* (2013.01); *C08J 9/232* (2013.01); *C08L 53/005* (2013.01); *C09K 21/14* (2013.01); *C08F 2810/50* (2013.01); *C08J 2201/034* (2013.01); *C08J 2203/14* (2013.01); *C08J 2205/044* (2013.01); *C08J 2353/02* (2013.01); *C08L 2201/02* (2013.01)

(58) Field of Classification Search
CPC .. C08F 8/20; C08F 297/04; C08L 9/00; C08L 51/04; C08J 2201/03; C08J 2351/06
See application file for complete search history.

(56) References Cited

U.S. PATENT DOCUMENTS

| 7,501,460 B1 * | 3/2009 | Weng ..................... B82Y 30/00 523/351 |
| 2008/0287559 A1 * | 11/2008 | King ......................... C08J 9/16 521/56 |

FOREIGN PATENT DOCUMENTS

| DE | 1301497 B | 8/1969 |
| DE | 137308 A3 | 8/1979 |
| EP | 3070118 A1 | 9/2016 |
| GB | 1472195 A | 5/1977 |
| WO | WO-2007058736 A1 | 5/2007 |
| WO | WO-2008021417 A2 | 2/2008 |
| WO | WO-2015065393 A1 | 5/2015 |
| WO | WO-2016123263 A1 | 8/2016 |
| WO | WO-2018007602 A1 | 1/2018 |
| WO | WO-2018060015 A1 | 4/2018 |
| WO | WO-2018210961 A1 | 11/2018 |

OTHER PUBLICATIONS

Truelsen et al Synthesis by ATRP of triblock copolymers with densely grafted styrenic end blocks from a polyisobutylene macroinitiator, Macromol. Rapid Commun. 21, 98-102 (2000), published on Feb. 2000.*
International Preliminary Examination Report for PCT/EP2018/062806 dated Apr. 12, 2019.
International Search Report for PCT/EP2018/062806 dated Jul. 27, 2018.
Written Opinion of the International Searching Authority for PCT/EP2018/062806 dated Jul. 27, 2018.
Beach, M., et al., "Development of a new class of brominated polymeric flame retardants based on copolymers of styrene and polybutadiene", Polymer Degradation and Stability, 2017, vol. 135, pp. 99-110.
Scheirs, J., et al., "Polystyrenes and Styrene Copolymers—An Overview", Modern Styrenic Polymers: Polystrenes and Styrenic Copolymers, 2003, pp. 25-42.
Vieweg, R. and Daumiller, G., "Polystyrol—Kunststoff Handbuch", Carl-Hanser-Verlag article, 1996, vol. 4, pp. 104-144.
U.S. Appl. No. 16/336,660, Martin et al.

* cited by examiner

*Primary Examiner* — Gregory Listvoyb
(74) *Attorney, Agent, or Firm* — Faegre Drinker Biddle & Reath LLP

(57) ABSTRACT

Brominated vinylaromatic-diene block copolymers (Br-SBC) comprising a vinylaromatic polymer block S and a brominated diene polymer block BB, wherein before bromination the weight-average molar mass $M_w$ of the block S is greater than or equal to $M_w$ of the block BB, use thereof as flame retardants, and also polymer compositions comprising these for unfoamed and foamed thermoplastic polymers, for example EPS and XPS.

12 Claims, No Drawings

BROMINATED FLAME RETARDANT

CROSS-REFERENCE TO RELATED APPLICATIONS

This application is a national stage application (under 35 U.S.C. § 371) of PCT/EP2018/062806, filed May 16, 2018, which claims benefit of European Application No, 17171490.0, filed May 17, 2017, both of which are incorporated herein by reference in their entirety.

The present invention relates to brominated vinylaromatic/diene block copolymers (Br-SBC), to a process for the production of these and to the use of these as flame-retardant additive, and also to compositions comprising foamed or unfoamed thermoplastic polymers, in particular polystyrenes, for example EPS and XPS, and a flame-retardant quantity of the brominated block copolymers of the invention.

Hexabromocyclododecane (HBCD), a flame retardant (FR) additive often used, has been assessed in various studies as hazardous to the environment, and corresponding regulations from the authorities intended to reduce these risks are therefore providing motivation to find a replacement for HBCD.

Materials that are potentially suitable are FR additives that are compatible with the foams intended for use (e.g. expandable polystyrene) and with foaming agents used during the foaming process, i.e. the FR additives are not permitted to have any disadvantageous effects on the formation of foam cells and on foam cell size.

It is moreover desirable that FR additives are capable of increasing the limiting oxygen index (LOI) values of moldings manufactured in the melt, for example foams, fibers, foils, sheets and pipes, thus permitting these moldings to pass standard fire tests. By way of example, incorporation of HBCD into a formulation for the production of extruded polystyrene foam (XPS) increases the LOI of the resultant foam from 19 (in the absence of HBCD) to more than 25. An LOI>25 permits use of standard fire tests with XPS foams, examples being Underwriters Laboratory (UL) 723 and European Norm (EN) Fire Test #ISO 11925-2 Class E.

Synthesis of brominated polybutadiene homopolymers (Br-PBD) produced with use of elemental bromine as brominating agent is widely mentioned in the literature (e.g. DD patent 137308, DE-A 1301497). However, these Br-PBDs do not have sufficient thermal stability and compatibility under typical melt-processing conditions to be useful as replacement for HBCD.

WO 2007/058736 describes brominated vinylaromatic/diene block copolymers (Br-SBC) and use of these as FR additive, in particular in blends with styrene (co)polymers, for example GPPS or SAN, and in foams produced therefrom. The Br-SBCs have from 5 to 90% by weight vinylaromatic monomer content and more than 0% by weight content of 1,2-butadiene isomers, preferably from more than 50 to more than 90% by weight (based on total butadiene content), and the weight-average molar mass Mw of these is from 1000 to 200000 g/mol, preferably from 50000 to 100000 g/mol.

More than 50% of the repeating butadiene units comprised therein are brominated. SBCs in particular suitable for bromination are diblock (styrene-butadiene) or triblock copolymers (styrene/butadiene/styrene). For blends with vinylaromatic (co)polymers, the styrene block content of the SBCs is at least from 10 to 15% by weight, preferably at least 30% by weight.

WO 2008/021417 describes corresponding symmetric brominated S-B-S triblock copolymers (Mw 135830 g/mol; 82% of the diene units brominated). The proportion of the polybutadiene block in the triblock copolymer is 60% by weight; the proportion of the terminal polystyrene blocks is respectively 20% by weight.

WO 2015/065393 discloses a foamed polymer mixture comprising (a) a thermoplastic styrene (co)polymer, (b) a brominated S-B-S triblock copolymer as FR additive and, as further additive (c), an unbrominated S-B diblock, or preferably S-B-S triblock, copolymer. The molar mass of triblock copolymer (b) is from 100000 to 160000 g/mol, and it comprises 64% by weight of bonded bromine. The abovementioned brominated SBC block copolymers have the disadvantage of being inadequately, i.e. not homogeneously, miscible with the vinylaromatic matrix (co)polymers, and they therefore frequently bring about nucleation during production of expanded polystyrene foams; this lead to reduced foam cell size and thus to reduced insulation effect.

WO 2016/123263 discloses brominated and bromohydrated SBC block copolymers comprising bromohydrin units —CHBr—CHOH— as flame retardants for blends, e.g. with polystyrene, and discloses extruded foams produced therefrom. Preference is given to di- and triblock copolymers. The foams have better foam cell size than known brominated SBCs. The production process has a plurality of steps. After the first step (partial bromination) the polymer is isolated; bromohydration is then carried out and the product is repeatedly precipitated.

The abovementioned production process is very complicated and uneconomic because it requires at least two steps.

It is an object of the present invention to provide brominated SBC block copolymers which exhibit homogeneous or at least improved miscibility as flame-retardant additive in compositions with unfoamed or foamed thermoplastic polymers, in particular vinylaromatic matrix homo- or copolymers, and in expanded or extruded foams produced therefrom. The resultant foams are moreover intended to have larger foam cells and to ensure good flame retardancy of the material.

The brominated SBC block copolymers are moreover intended to be amenable to production by an industrial process that is not excessively complicated.

The invention provides brominated vinylaromatic-diene block copolymers (Br-SBC) comprising at least one vinylaromatic polymer block S, in particular polystyrene block, and at least one brominated diene polymer block BB, wherein before bromination the weight-average molar mass $M_w$ (or length) of the block S is greater than or equal to $M_w$ (or length) of the block BB;

the molar mass $M_w$ of the block BB (before bromination) is from 50000 to 130000 g/mol; and the molar mass $M_w$ of the block S is from 60000 to 300000 g/mol.

The molar mass $M_w$ is determined by means of GPC in accordance with ISO 16014-3:2012 (relative to polystyrene standards at 25° C. in THF) before bromination of the block copolymer of the invention. When the monomer composition is known, the correct molar mass $M_w$ of the diene polymer can by way of example be calculated via mixed calibration.

In the case of styrene-butadiene (block) copolymers, the formula $$M_w(GPC) = M_{W\;absolute}(\text{polystyrene content}) + M_{W\;absolute}(\text{polybutadiene content}) \times 1.72$$

provides a good approximation for calculation of the molar mass to be expected from GPC measurement in the case of calibration with polystyrene standards. For other monomer combinations, the absolute molar mass can suitably be determined by methods such as light scattering coupled with GPC. An alternative that can be used is universal calibration. Appropriate GPC calibrations can be with the aid of commercially available software, for example from Polymer Standards Service, Mainz, with use of Mark-Houwink parameters.

The Br-SBC block copolymers of the invention can be linear or star-shaped.

In the case of star-shaped block copolymers, at least one of the star branches preferably comprises a vinylaromatic polymer block S and a brominated diene polymer block BB. If the star-shaped block copolymers are produced by sequential anionic polymerization in a single reactor (one-top process), at least one of the star branches comprises a vinylaromatic polymer block S and a brominated diene polymer block BB.

The invention further provides a process for the production of the Br-SBC block copolymers of the invention.

The invention further provides the use of the Br-SBC block copolymers of the invention as flame retardants in polymer compositions comprising thermoplastic polymers (matrix polymer), in particular vinylaromatic homo- or copolymers, and provides expanded or extruded foams produced therefrom.

The invention further provides polymer compositions comprising at least one thermoplastic polymer, in particular vinylaromatic homo- or copolymer, and at least one Br-SBC block copolymer of the invention as flame retardant.

The invention further provides expanded or extruded foams, in particular EPS or XPS foams, made of the polymer compositions of the invention.

The invention likewise provides the use of the foams of the invention, in particular EPS or XPS, as insulation material.

When the Br-SBC block copolymers of the invention are used as flame retardant in polymer compositions comprising at least one vinylaromatic homo- or copolymer as matrix polymer and in expanded or extruded foams produced therefrom, the molar mass $M_w$ (or length) of the S-block of the Br-SBC block copolymer is advantageously from 30 to 70% of the weight-average molar mass $M_w$ of the vinylaromatic matrix (co)polymer, preferably styrene homo- or copolymer, for example GPPS or SAN.

Br-SBC Block Copolymer

The following can be used as vinylaromatic monomers for the block S: styrene, alpha-methylstyrene, p-methylstyrene, ethylstyrene, tert-butylstyrene, vinyltoluene or a mixture thereof. It is preferable to use styrene.

The following are preferably used as dienes for the block BB: butadiene, isoprene, 2,3-dimethylbutadiene, 1,3-pentadiene or 1,3-hexadiene or a mixture thereof. It is particularly preferable to use 1,3-butadiene.

It is preferable that—before bromination—the Br-SBC block copolymer of the invention comprises, as diene polymer blocks, only diene homopolymer blocks BB. It is also possible, but not preferable, that one or more stochastic soft blocks B/S made of diene/vinylaromatic copolymers with vinylaromatic monomer content of from 1 to 99% is/are present.

The 1,2-vinyl content of the Br-SBC block copolymer of the invention—before bromination—is preferably above 10%.

Vinyl content means the relative proportion of 1,2 linkages of the diene units of the Br-SBC block copolymer before bromination, based on the entirety of the 1,2, 1,4-cis and 1,4-trans linkages.

High 1,2-vinyl content of the Br-SBC block copolymer of the invention—before bromination—is advantageous.

The 1,2-vinyl content of the Br-SBC block copolymer of the invention—before bromination—is preferably more than 30%, particularly preferably more than 50%, very particularly preferably more than 60%.

The molar mass $M_w$ of the block BB (before bromination) of the Br-SBC block copolymer of the invention is generally from 50000 to 130000 g/mol, preferably from 60000 to 120000 g/mol.

In the case of linear block copolymers of the invention, the molar mass $M_w$ of the block BB is preferably from 70000 to 130000 g/mol, particularly preferably from 80000 to 120000 g/mol.

In the case of star-shaped block copolymers of the invention, the molar mass $M_w$ of the block BB is preferably from 50000 to 90000 g/mol, particularly preferably from 60000 to 80000 g/mol.

The molar mass $M_w$ of the block S of the Br-SBC block copolymer of the invention is generally from 60000 to 300000 g/mol, preferably from 70000 to 200000 g/mol, particularly preferably from 80000 to 130000 g/mol.

The proportion of the diene polymer, in particular of the polybutadiene—before bromination—is often less than 60% by weight, based on the Br-SBC block copolymer.

Preferred Br-SBC block copolymers of the invention are linear Br-SBC block copolymers of the general structure

K-S-BB-A                               (Ia), in which K and A, respectively mutually independently, are absent or are a polymer block different from S and BB; S and BB are as described above; and the molar mass $M_w$ (or block length) of the blocks K and A is respectively smaller than $M_w$ of the block BB.

The phrase "different polymer block" can also mean a vinylaromatic polymer block which differs only in molar mass $M_w$—as defined above—from the block S.

The molar mass $M_w$ of the blocks K and A, if present, is—mutually independently—preferably in the range from 15000 to 35000 g/mol, in particular from 20000 to 30000 g/mol.

Suitable monomers for the block A are those that are compatible with the monomers used for the blocks S, BB and, if present, K. It is preferable that the block A is a vinylaromatic (co)polymer block, in particular a styrene (co)polymer block. It is particularly preferable that the block A is a vinylaromatic homopolymer block, in particular a polystyrene block. The block A is often a, preferably stochastic, vinylaromatic/diene copolymer block, in particular a, preferably stochastic, styrene/butadiene copolymer block.

Vinylaromatic monomers used for the block A can be those mentioned above for the block S. It is preferable to use styrene.

Suitable monomers for the block K are those that are compatible with the monomers used for the blocks S, BB and, if present, A. The structure of the block K is preferably that described above for the block A.

Preference is given to diblock copolymers of the structure (Ia) in which K and A are absent.

Particular preference is given to asymmetrical Br-SBC triblock copolymers of the structure (Ia) in which K is absent and A is a vinylaromatic polymer block, in particular polystyrene block.

The weight-average molar mass $M_w$ of linear Br-SBC block copolymers of the invention, in particular of asymmetrical Br-SBC triblock copolymers, is preferably from 150000 to 500000 g/mol, particularly preferably from 150000 to 400000 g/mol, very particularly preferably from 150000 to 300000 g/mol.

Br-SBC block copolymers of the invention to which preference is further given are star-shaped Br-SBC block copolymers of the general structure

   (Ib), in particular

   (Ib-1), in which
Z=moiety of a polyfunctional coupling agent or initiator; P, Q, R are various star branches, where at least one of the star branches P, Q or R comprises a vinylaromatic polymer block S and a brominated diene polymer block BB; p, q, r=natural numbers≥0; and m=total number of star branches or sum of the indices p, q, (in particular sum of the indices p, q and r), where m is a natural number from 2 to 10, preferably from 3 to 5, in particular 3 or 4.

The star-shaped Br-SBC block copolymers of the invention are often, and preferably, asymmetrical.

Star branch P in structure (Ib) usually has a vinylaromatic polymer block S and a brominated diene polymer block BB (p≥1). The block S is generally external.

The star-shaped Br-SBC block copolymers of the invention have at least one, preferably one or two (p=1 or 2), in particular one, star branch P.

Preferred star branches P have the structure ~BB-S or ~A-BB-S, in which ~ indicates the location of bonding to the moiety Z, A is a polymer block which differs from S and BB as described above, and BB and S are as described above.

The star branches Q and R in structure (Ib) can mutually independently have the structure ~A-BB, ~S, ~BB, and/or ~BB-A.

Preference is given to star-shaped block copolymers of the formula (Ib-1) in which P=~BB-S, Q =~BB-A, r=0, and BB, S and A are as defined above.

Preference is further given to star-shaped block copolymers of the formula (Ib-1) in which P=~BB-S, Q=~S and Z=~BB and preferably m=from 3 to 10, in particular from 3 to 5.

Preference is further given to star-shaped block copolymers of the formula (Ib-1) in which P=~BB-S, Q=~A and Z=~BB and preferably m=from 3 to 10, in particular from 3 to 5.

Particular preference is given to star-shaped block copolymers of the formula (Ib-1) in which P=~BB-S, Q=~BB-A, r=0 and m=from 3 to 10, in particular from 3 to 5, and BB, S and A are as defined above.

Very particular preference is given to asymmetrical star-shaped block copolymers of the formula (Ib-1) in which P=~BB-S, Q=~BB-A, r=0, p=1, q=3, and BB, S and A are as defined above.

The weight-average molar mass $M_w$ of star-shaped Br-SBC block copolymers of the invention, in particular those of the structure (Ib) where m=from 3 to 5, is often from 150000 to 600000 g/mol, preferably from 180000 to 300000 g/mol.

Preference is further given to mixtures comprising (or consisting of):
α) at least one, preferably one, linear Br-SBC block copolymer of the invention, and β) at least one, preferably one, other brominated diene/vinylaromatic copolymer different from α), in particular Br-SBC block copolymer,
comprising at least one brominated diene polymer block BB, at least one vinylaromatic polymer block A and no vinylaromatic polymer block S, where A, S and BB are defined as above, and the molar mass $M_w$ (or block length) of the block A is respectively smaller than $M_w$ of the block BB.

The blocks S and BB mentioned above for β) are defined here as stated for the Br-SBC block copolymer of the invention.

The brominated diene/vinylaromatic copolymer β) is preferably a linear Br-SBC block copolymer, in particular a linear Br-SBC block copolymer of the structure H-BB-A (Ic) in which H is a vinylaromatic polymer block, and the molar mass $M_w$ (or block length) of the block H is smaller than $M_w$ of the block BB, and A and BB are as described above.

The molar masses $M_w$ and the composition of the blocks A and H in structure (Ic) can be identical or different; it is preferable that the blocks A and H are identical.

Preference is given to abovementioned mixtures comprising a) a linear Br-SBC block copolymer of the structure (Ia), preferably asymmetrical Br-SBC triblock copolymers of the structure (Ia) in which K is absent and A is a vinylaromatic polymer block, in particular polystyrene block; and β) is a linear Br-SBC block copolymer of the structure H-BB-A (Ic).

Preference is further given to mixtures comprising (or consisting of):
α) at least one, preferably one, linear Br-SBC block copolymer of the invention, and
γ) at least one, preferably one, brominated polybutadiene homopolymer (Br-PBD), the weight-average molar mass $M_w$ (or length) of which—before bromination—is smaller than or equal to $M_w$ (or length) of the block BB.

The abovementioned block BB is defined here as stated for the Br-SBC block copolymer of the invention.

Preference is further given to mixtures comprising (or consisting of):
α) at least one, preferably one, linear Br-SBC block copolymer of the invention;
β) at least one, preferably one, other brominated diene/vinylaromatic copolymer—different from α), in particular Br-SBC block copolymer, as described above; and
γ) at least one, preferably one, brominated polybutadiene homopolymer (Br-PBD), as described above.

The molar ratio of α) to β), α) to γ) or α) to the entirety of β) and γ) is generally from 1:0.01 to 10; preferably from 1:0.1 to 1:5; particularly preferably from 1:0.5 to 1:3; very particularly preferably from 1:1 to 1:2.

Production of the Br-SBC Block Copolymer

The unbrominated precursor of the Br-SBC block copolymers of the invention can by way of example be formed by sequential anionic polymerization.

Anionic polymerization initiator used can comprise the usual mono-bi- or polyfunctional alkali metal alkyl, aryl or aralkyl compounds. It is advantageous to use organolithium compounds, for example ethyl-, propyl-, isopropyl-, n-butyl-, sec-butyl-, tert-butyl-, phenyl-, diphenylhexyl-, hexamethyldi-, butadienyl-, isoprenyl-, polystyryllithium, 1,4-dilithiobutane, 1,4-dilithio-2-butene or 1,4-dilithiobenzene. The quantity of polymerization initiator required depends on the desired molecular weight.

It is generally in the range from 0.001 to 5 mol % based on the total quantity of monomer, The unbrominated precursor of the Br-SBC block copolymers of the invention can be produced in one or more reactors; production in one reactor is preferred.

The anionic polymerization is carried out in a plurality of stages and with monofunctional initiation, for example beginning with production of the block S. A portion of the monomers is used as initial charge in the reactor, and the polymerization is initiated by adding the initiator. In order to achieve a defined chain structure that can be calculated from monomer- and initiator-addition parameters, it is advisable to continue the process to a high conversion level (above 99%) before the second monomer is added. However, this is not essential.

The monomer addition sequence depends on the desired block structure. In the case of monofunctional initiation, by way of example, in a first step the vinylaromatic compound is either used as initial charge or is directly metered into the system and polymerized. This is followed by way of example by addition and polymerization of the diene. This can be followed, by way of example, by addition of another monomer in order to polymerize a further polymer block A onto the material. Another possibility, instead of this, is that polymer blocks required are bonded to one another by a coupling reaction. In the case of bifunctional initiation, by way of example, in a first step the diene block (=block BB before bromination) is constructed, and then the S block is constructed.

Asymmetrical star-block copolymers can be obtained by way of example by separate production of the individual star branches or by multiple initiation, for example double initiation with division of the initiator in a ratio of from 2/1 to 10/1.

In the case of production in a plurality of reactors, the various polymer chains (e.g. star branches) are produced in various reactors by sequential anionic polymerization. The usual procedure here is that a polymerization initiator is added once to each reactor, the monomers are then introduced in succession and respectively polymerized to give full conversion. The resultant "living" polymer chains from the various reactors are then combined into a reactor and further polymerized, optionally with further addition of initiator and further addition of monomer.

Preference is given to production of the unbrominated precursor of the Br-SBC block copolymers of the invention in one reactor. Production of asymmetrical star-shaped Br-SBC block copolymers in one reactor is achieved here by using at least two additions of a polymerization initiator.

In the case of production of, by way of example, asymmetrical star-shaped block copolymers of the formula (Ib-1), in which P=~BB-S, Q=~BB-A, r=0, p=1, q=3, and BB, S and A are defined as above, the vinylaromatic monomer S1 (first portion of block S) and the initiator Ini1 are simultaneously added in the reactor and fully polymerized, and these are followed, again simultaneously, by the vinylaromatic monomer S2 (second portion of block S or =block A) and initiator Ini2. Two "living" polymer chains S1-S2-Ini1 or S-Ini1 and S2-Ini2 or A-Ini2 are thus obtained alongside one another, and then the diene is introduced and fully polymerized (=block BB before bromination).

The ratio of initiator Ini1 to initiator Ini2 determines the relative content of the respective star branches distributed stochastically in the individual star-shaped block copolymers after coupling. The block S is formed from the additions of the vinylaromatic monomers S1 and S2; the block A is formed solely by the addition of S2. The molar initiator ratio Ini2/Ini1 is preferably in the range from 4/1 to 1/1, particularly preferably in the range from 3.5/1 to 1.5/1.

The sequential anionic polymerization can be undertaken in the presence of a solvent. Solvents suitable are the usual aliphatic, cycloaliphatic or aromatic hydrocarbons for anionic polymerization having from 4 to 12 carbon atoms, for example pentane, hexane, heptane, cyclohexane, methylcyclohexane, isooctane, benzene, alkylbenzenes, for example toluene, xylene, ethylbenzene or decalene, or a suitable mixture. Preference is given to use of cyclohexane and of methylcyclohexane.

In order to obtain a relatively high proportion of 1,2 linkage or relatively high vinyl content of the diene blocks or of the block copolymer comprising these, it is also preferable to add a donor solvent, for example dioxane or tetrahydrofuran (THF), or chelating amines, for example tetramethylethylenediamine or methylated oligoamines, for example pentamethyldiethylenetriamine, or crown ethers, for example 12-crown-4, 15-crown-5, 18-crown-6, or cryptands. When THF is used, preference is given to quantities above 0.25% by volume, based on the solvent. Particular preference is given to from 1 to 10% by volume of THF, based on the solvent. In the case of chelating amines, a sufficient quantity is from 1 to 2 mol of amine, based on lithium, and in the case of crown ethers or cryptands a sufficient quantity is 1 mol per mole of lithium.

Once the polymerization has ended, the living polymer chains can be sealed by a chain terminator. Suitable chain terminators are protonating substances or Lewis acids, for example water, alcohols, aliphatic or aromatic carboxylic acids, and also inorganic acids, for example carbonic acid or boric acid.

Instead of addition of a chain terminator after the polymerization has ended, it is also possible to use polyfunctional coupling agents, for example polyfunctional aldehydes, ketones, esters, anhydrides or epoxides, to link the living polymer chains in the shape of a star. By coupling identical or different blocks, this method can give symmetrical and asymmetrical star-block copolymers with arms that can have the abovementioned block structures.

The invention further provides a process for the production of the Br-SBC block copolymers of the invention, comprising steps a) to d):

a) production of at least one linear or star-shaped vinylaromatic-diene block copolymer (SBC) comprising at least one vinylaromatic polymer block S, in particular polystyrene block, and at least one diene polymer block B (=unbrominated precursor of the block BB) by sequential anionic polymerization, where the weight-average molar mass $M_w$ of the block S is greater than or equal to $M_w$ of the block BB;

b) provision of a homogeneous reaction solution comprising the SBC obtained in step a), at least one brominating agent and at least one solvent;

c) bromination of more than 50% of the nonaromatic double bonds of the SBC copolymer, based on the nonaromatic double bond content of the SBC copolymer before bromination; and d) isolation of the Br-SBC copolymer obtained in step c).

The reaction conditions under which step c) is carried out, in particular the time frame within which step c) is carried out, are/is usually sufficient to achieve bromination of more than 50% of the nonaromatic double bonds comprised in the SBC copolymer, based on the nonaromatic double bond content of the SBC copolymer before bromination. The content of nonaromatic double bonds is determined by $^1$H NMR spectroscopy.

The usual techniques are used to isolate the brominated SBC block copolymer (=Br-SBC).

Once a desired degree of bromination has been achieved, in particular when a tribromide is used as brominating agent, for example tetraalkylammonium tribromide or pyridinium tribromide (PTB), byproducts such as tetraalkylammonium monobromide or pyridinium hydrobromide (PHB) can be removed from the reaction solution by washing, decanting or filtration and reclaimed. Other byproducts, in particular bromide salts, can be removed by passing the filtrate through a silica gel or through an ion-exchanger resin bed. It is preferable that the filtrate discharged from the ion-exchanger resin bed is washed with a quantity of aqueous sodium hydrogensulfite solution that is sufficient to neutralize or quench unreacted brominating agent (e.g. PTB) that can be present in the filtrate. This procedure can eliminate any orange color (possibly due to the presence of unreacted PTB) that can be present in the filtrate before washing with aqueous sodium hydrogensulfite solution.

The brominated polymer (Br-SBC) of the invention is generally obtained by precipitation in a medium such as methanol in which the brominated polymer is substantially insoluble and preferably completely insoluble.

The brominating agent preferably comprises a tribromide selected from pyridinium tribromide, phenyltrimethylammonium tribromide and a tetralkylammonium tribromide, for example tetrabutylammonium tribromide, preferably pyridinium tribromide and particularly preferably tetraalkylammonium tribromide. The brominating agent optionally comprises a solvent.

By way of example, chlorinated solvents such as methylene chloride are suitable as solvent for tetraalkylammonium tribromides, and tetrahydrofuran (THF) is an example of a suitable solvent for PTB.

An alternative preferred brominating agent comprises a combination of elemental bromine with a solvent or solvent mixture, and can optionally comprise a monobrominated species, for example tetraalkylammonium monobromide. A particularly preferred alternative brominating agent is a combination of elemental bromine with a mixture of a chlorinated hydrocarbon, preferably carbon tetrachloride and an alcohol. The alcohol is preferably selected from mono- or polyhydric alcohols having from 1 to 12 carbon atoms ($C_{1-12}$), particularly preferably monohydric alcohols having from 1 to 8 carbon atoms ($C_{1-8}$), very particularly preferably monohydric alcohols having from 1 to 4 carbon atoms ($C_{1-4}$), for example methanol, ethanol, n- and isopropanol and n-, sec-, iso- and tert-butanol.

It is preferable to produce the brominated butadiene copolymers of the present invention by selective bromination, particularly by selective bromination under conditions that are mild rather than aggressive. The bromination is preferably carried out ionically, particularly cationically, rather than by way of a free-radical mechanism. It is very particularly preferable that the bromination of butadiene copolymers proceeds substantially without, preferably entirely without, free-radical substitution reactions. Ionic bromination is preferred over free-radical bromination because it is assumed that the latter will form tertiary bromination products that in turn could contribute to poorer thermal stability. It is moreover assumed that free-radical bromination will also brominate benzylic groups within the vinylaromatic units, in addition to the unsaturated bonds in the diene units of the SBC block copolymer. The thermal stability values of ionic bromination products are comparable with those of HBCD.

The tertiary bromine content of brominated copolymers of the present invention is preferably sufficiently low to have no disadvantageous effects on the thermal stability of the brominated block copolymers.

Bromination of tertiary carbon atoms or incomplete bromination of the double bonds present leads to reduced thermal stability when comparison is made with the stoichiometrically brominated compound without brominated tertiary carbon atoms. The thermal stability achieved must be sufficient for the intended use of the brominated copolymer.

The term "mild" as used herein with reference to bromination reactions refers to reactions which use a selective brominating agent, preferably a tribromide, for example a tetraalkylammonium tribromide or pyridinium tribromide, and which preferably minimize, particularly preferably eliminate, formation of tertiary bromine units, e.g. tertiary bromides.

The term "aggressive" as used herein with reference to bromination reactions means that the reaction conditions lead to formation of tertiary bromides. Use of elemental or molecular bromine as brominating agent often causes formation of tertiary bromides.

Selective halogenation of dienes in general terms, and selective bromination, and selective bromination of dienes under mild conditions, in particular of polybutadienes, is known and described in the literature (see WO 2007/058736 A, p. 7, line 4 to p. 8, line 4).

Preferred Br-SBC block copolymers of the invention have been fully brominated or almost fully brominated. The expression "fully brominated" means that double bonds or unsaturated units present in the diene unit before bromination have been fully brominated. However, partially brominated Br-SBC block copolymers can be more thermally stable than the corresponding fully brominated Br-SBC block copolymers.

A relatively large number of unreacted double bonds in the block copolymer could lead to crosslinking which is undesired because of formation of insoluble gel in the resultant products. The gels can impair physical properties, surface, or optical properties or lead to increased coloration. When blends with vinylaromatic (co)polymers are converted to foam structures, the crosslinked moieties tend to have a disadvantageous effect on foaming, with resultant nonuniform foam structures.

The invention further provides the use of the Br-SBC block copolymers of the invention as flame retardants.

The flame retardants or Br-SBC block copolymers of the invention are used in the invention for production of unfoamed or foamed thermoplastic polymers, in particular vinylaromatic homo- or copolymers. To this end, the flame retardant is preferably physically mixed in the melt with the corresponding polymer and then first compounded to give a ready-to-use polymer mixture and then, in a second step, further processed with the same polymer or with another polymer. However, it is also possible that the flame retardant is added to the polymer melt at a subsequent juncture.

In the case of vinylaromatic homo- or copolymers it is alternatively preferable to add the compounds (I) of the invention before, during and/or after production by suspension polymerization.

The invention also provides polymer compositions comprising at least one thermoplastic polymer, in particular vinylaromatic homo- or copolymer, and at least one Br-SBC block copolymer of the invention as flame retardant.

The quantity of the Br-SBC block copolymer of the invention comprised in the polymer composition of the invention is sufficient to ensure adequate flame retardancy. The expression "sufficient quantity" means the quantity that is sufficient to provide a molding composition or a foamed or unfoamed molding made of the polymer composition of the invention with from 0.1 to 5% by weight bromine content, based on the polymer composition. Bromine content below 0.1 percent does not provide acceptable flame retardancy. Although it is possible to produce products with bromine contents above 5% by weight, these products are economically unattractive, and the high bromine content could moreover have a disadvantageous effect on the physical properties of the product. The quantity used of the Br-SBC block copolymer of the invention, based on the thermoplastic polymer (=matrix polymer), is often from 0.3 to 10% by weight, preferably from 0.5 to 5% by weight.

Thermoplastic polymer used can by way of example comprise foamed or unfoamed vinylaromatic homo- or copolymers such as styrene polymers, inclusive of ABS, ASA, SAN, AMSAN, polyesters, polyimides, polysulfones, polyolefins such as polyethylene and polypropylene, polyacrylates, polyetheretherketones, polyurethanes, polycarbonates, polyphenylene oxides, unsaturated polyester resins, phenolic resins, polyamides, polyether sulfones, polyetherketones and polyether sulfides, in each case individually or in a mixture in the form of polymer compositions.

The expression "vinylaromatic homo- or copolymer" in the invention comprises styrene polymers such as substituted species (e.g. poly(alpha-methylstyrene)), ring-substituted species (e.g. halogenated styrenes such as 2- or 4-bromostyrene, alkoxylated styrenes such as 2- or 4-methoxystyrene, nitrated styrenes (e.g. 2-nitrostyrene or 4-nitrostyrene) and alkylated styrenes such as 2- or 4-methylstyrene or 2,4-dimethylstyrene)) and unsubstituted species (e.g. polystyrene homopolymer), and also copolymers (e.g. styrene/acrylonitrile copolymers).

Preferred vinylaromatic homo- or copolymers used are styrene polymers such as glassclear polystyrene (GPPS), high-impact polystyrene (HIPS), anionically polymerized polystyrene or impact polystyrene (AIPS), styrene-alpha-methylstyrene copolymers, acrylonitrile-butadiene-styrene copolymers (ABS), styrene-acrylonitrile copolymers (SAN), acrylonitrile-alpha-methylstyrene copolymers (AMSAN), acrylonitrile-styrene-acrylate (ASA), methacrylate-butadiene-styrene (MBS), methyl methacrylate-acrylonitrile-butadiene-styrene (MABS) polymers or a mixture thereof or with polyphenylene ether (PPE).

The expression "styrene polymer" in the invention comprises polymers based on styrene, alpha-methylstyrene or a mixture of styrene and alpha-methylstyrene; this applies analogously to the styrene content in SAN, AMSAN, ABS, ASA, MBS and MABS. Styrene polymers of the invention are based on at least 50% by weight of styrene and/or alpha-methylstyrene monomers.

Preference is given to polymer compositions of the invention comprising foamed or unfoamed vinylaromatic homo- or copolymers, in particular styrene homo- or copolymers, in each case individually or in a mixture in the form of polymer blend.

The vinylaromatic homo- or copolymers are obtained in a known manner by bulk, solution, suspension, precipitation or emulsion polymerization, preference being given here to bulk and solution polymerization. Details of these processes are described by way of example in Kunststoffhandbuch [Plastics handbook], eds. R. Vieweg and G. Daumiller, vol. 4 "Polystyrol" ["Polystyrene" ], Carl-Hanser-Verlag Munich, 1996, pp. 104 ff., and also in "Modern Styrenic Polymers: Polystyrenes and Styrenic Copolymers" (eds. J. Scheirs, D. Priddy, Wiley, Chichester, UK, (2003), pp. 27 to 29) and in GB-A 1472195.

In order to improve mechanical properties or thermal stability, the styrene polymers mentioned can, optionally with use of compatibilizers, be blended with thermoplastic polymers, for example polyamides (PA), polyolefins, for example polypropylene (PP) or polyethylene (PE), polyacrylates, for example polymethyl methacrylate (PMMA), polycarbonate (PC), polyesters, for example polyethylene terephthalate (PET) or polybutylene terephthalate (PBT), polyether sulfones (PES), polyetherketones or polyether sulfides (PES) or a mixture thereof, generally in total proportions of at most 30 parts by weight, preferably in the range from 1 to 10 parts by weight, based on the entire polymer melt. Mixtures in the quantitative ranges mentioned are moreover also possible with, for example, hydrophobically modified or functionalized polymers or oligomers, rubbers, for example polyacrylates or polydienes, for example styrene-butadiene block copolymers or biodegradable aliphatic or aliphatic/aromatic copolyesters.

Examples of suitable compatibilizers are maleic-anhydride-modified styrene copolymers, and organosilanes and polymers containing epoxy groups.

It is also possible to add, to the styrene polymer melt, polymer recyclates of the thermoplastic polymers mentioned, in particular styrene polymers and expandable styrene polymers (EPS) in quantities that do not substantially impair their properties, generally in quantities of at most 50 parts by weight, in particular in quantities of from 1 to 20 parts by weight.

The weight-average molar mass $M_w$ of the thermoplastic polymers, in particular vinylaromatic homo- or copolymers or styrene polymers, comprised as matrix polymer in the polymer compositions of the invention is preferably in the range from 120000 to 400000 g/mol, particularly preferably in the range from 150000 to 250000 g/mol.

In the case of vinylaromatic homo- or copolymers or styrene polymers as matrix polymer, the molar mass $M_w$ (or length) of the S-block of the Br-SBC block copolymer of the invention is advantageously from 30 to 70% of the weight-average molar mass $M_w$ of the vinylaromatic matrix (co) polymer, preferably styrene homo- or copolymer, for example GPPS or SAN.

These foamed and unfoamed polymer compositions permit very fine dispersion of the flame retardant of the invention in the matrix polymer with no resultant adverse effect on foaming.

The polymer composition of the invention can moreover comprise other additives, preferably those selected from the group consisting of: other flame-retardant additives (different from the Br-SBC block copolymers of the invention), heat stabilizers, UV stabilizers, antioxidants, nucleating agents, foaming agents (inter alia blowing agents), acid scavengers, athermanous substances, fillers, plasticizers, and soluble and insoluble inorganic and/or organic dyes and pigments.

It is preferable to use athermanous substances, in particular graphite, in quantities that are preferably from 0.01 to 7% by weight, based on the polymer composition.

The total quantity used of the abovementioned additives can be from 0.01 to 20% by weight, preferably from 0.05 to 15% by weight, based on the polymer composition of the invention.

The invention further provides expanded or extruded foams obtained from the polymer compositions of the invention.

Preference is given to flame-retardant polymer foams, in particular based on styrene polymers, preferably EPS and XPS.

The density of the flame-retardant polymer foams is preferably in the range from 5 to 200 kg/m³, particularly preferably in the range from 10 to 50 kg/m³, and their proportion of closed cells is preferably more than 80%, particularly preferably from 90 to 100%.

The flame-retardant, expandable styrene polymers (EPS) and extruded styrene polymer foams (XPS) of the invention can be processed via addition of a blowing agent and of the flame-retardant of the invention before, during and/or after suspension polymerization or via incorporation of a blowing agent by mixing into the polymer melt and then extrusion and pelletization under pressure to give expandable pellets (EPS) or via extrusion and depressurization with use of correspondingly shaped dies to give foam sheets (XPS) or foam strands.

In a preferred embodiment, the polymer is an expandable polystyrene (EPS).

In another preferred embodiment, the foam is an extruded styrene polymer foam (XPS).

The molar mass $M_w$ of expandable styrene polymers is preferably in the range from 120000 to 400000 g/mol, particularly preferably in the range from 150000 to 250000 g/mol, measured by means of gel permeation chromatography in accordance with DIN 55672-1 with refractiometric detection (RI) against polystyrene standards.

The styrene polymer melt comprising blowing agent generally comprises a total proportion, based on the polymer composition of the invention, of from 2 to 10% by weight, preferably from 3 to 7% by weight, of one or more homogeneously distributed blowing agents. Suitable blowing agents are the physical blowing agents usually used in EPS, for example aliphatic hydrocarbons having from 2 to 7 carbon atoms, alcohols, ketones, ethers or halogenated hydrocarbons. It is preferable to use isobutane, n-butane, isopentane, n-pentane. For XPS it is preferable to use $CO_2$ or a mixture thereof with alcohols and/or $C_2$-$C_4$-carbonyl compounds, in particular ketones. For XPS it is likewise possible to use a mixture of $CO_2$ with aliphatic hydrocarbons having from 2 to 5 carbon atoms, in particular isobutane, and/or with ethers such as dimethyl ether.

Finely divided internal-water droplets can be introduced into the styrene polymer matrix in order to improve foamability. This can by way of example be achieved by adding water into the molten styrene polymer matrix. The location at which the water is added can be upstream of, the same as, or downstream of that at which the blowing agent is added. Homogeneous distribution of the water can be achieved by means of dynamic or static mixers. A sufficient quantity of water, based on the polymer composition, is generally from 0 to 2% by weight, preferably from 0.05 to 1.5% by weight.

Foaming of expandable styrene polymers (EPS) with at least 90% of the internal water in the form of internal water droplets with diameter in the range from 0.5 to 15 μm forms foams with adequate cell number and homogeneous foam structure.

The quantity of blowing agent and of water added is such that the expandability α of the expandable styrene polymers (EPS), defined as bulk density before foaming/bulk density after foaming, is at most 125, preferably from 20 to 100.

The bulk density of the expandable styrene polymer pellets (EPS) of the invention is generally at most 700 g/l, preferably in the range from 590 to 660 g/l. When fillers are used, bulk densities can be in the range from 590 to 1200 g/l, depending on the nature and quantity of the filler.

It is moreover possible that other additives as previously described above are added, together or at separate locations, to the styrene polymer melt, for example by way of mixers or ancillary extruders. Quantities of dyes and pigments added are generally in the range from 0.01 to 10% by weight, preferably in the range from 1 to 5% by weight. In order to achieve homogeneous and microdisperse distribution of the pigments in the styrene polymer, it can be advantageous in particular in the case of polar pigments to use a dispersing agent, examples being organosilanes, polymers containing epoxy groups or maleic-anhydride-grafted styrene polymers. Preferred plasticizers are mineral oils and phthalates, which can be used in quantities of from 0.05 to 10% by weight. Again, these substances can analogously be added before, during and/or after suspension polymerization to give EPS of the invention.

For production of the expandable styrene polymers of the invention by the pelletization process, the blowing agent can be incorporated by mixing into the melt of the matrix polymer. A possible process comprises the stages of v1) melt production, v2) mixing, v3) cooling, v4) conveying and v5) pelletization. Each of these stages can be implemented via the apparatuses or apparatus combinations known in plastics processing. Suitable devices for incorporation by mixing are static or dynamic mixers, for example extruders. The polymer melt can be taken directly from a polymerization reactor or produced directly in the mixing extruder or a separate compounding extruder by melting of polymer pellets. The melt can be cooled in the mixing assemblies or in separate coolers. An example of a possible pelletization method is pressurized underwater pelletization, pelletization by rotating blades and cooling by spray-misting of cooling liquids, or atomizing pelletization. Examples of apparatus arrangements suitable for carrying out the process are:

xi) polymerization reactor—static mixer/cooler—pelletizer
xii) polymerization reactor—extruder—pelletizer
xiii) extruder—static mixer—pelletizer
xiv) extruder—pelletizer The arrangement can moreover have ancillary extruders for the introduction of additives, for example of solids or heat-sensitive additives.

The temperature at which the styrene polymer melt comprising blowing agent is conveyed through the die plate is generally in the range from 140 to 300° C., preferably in the range from 160 to 240° C. Cooling down to the region of the glass transition temperature is not necessary.

The die plate is heated at least to the temperature of the polystyrene melt comprising blowing agent. The temperature of the die plate is preferably in the range from 20 to 100° C. above the temperature of the polystyrene melt comprising blowing agent. This prevents deposition of polymer in the dies and ensures problem-free pelletization.

In order to obtain marketable pellet sizes, the diameter (D) of the die perforations at the outlet from the die should be in the range from 0.2 to 1.5 mm, preferably in the range from 0.3 to 1.2 mm, particularly preferably in the range from 0.3 to 0.8 mm. This permits specific achievement of pellet sizes below 2 mm, in particular in the range of 0.4 to 1.4 mm, inclusive of die swell.

Particular preference is given to a process for the production of halogen-free flame-retardant, expandable styrene polymers (EPS) comprising the following steps:

s1) incorporation, at a temperature of at least 150° C., by means of static or dynamic mixers, of an organic blowing agent and from 0.3 to 10% by weight, based on the matrix polymer, of the flame retardant of the invention into the melt of the matrix polymer, s2) cooling of the styrene polymer melt comprising blowing agent to a temperature of at least 120° C., s3) discharge through a die plate with perforations with diameter at most 1.5 mm at the outlet from the die, and
s4) underwater pelletization of the melt comprising blowing agent directly downstream of the die plate at a pressure in the range from 1 to 20 bar.

Preference is also given to production of the expandable styrene polymers (EPS) of the invention by suspension polymerization in aqueous suspension in the presence of the flame retardant of the invention and of an organic blowing agent.

In the case of suspension polymerization, it is preferable to use styrene alone as monomer.

However, it is also possible to use other ethylenically unsaturated monomers to replace up to 20% of the weight thereof, examples being alkylstyrenes, divinylbenzene, acrylonitrile, 1,1-diphenylethylene and alpha-methylstyrene.

In the case of suspension polymerization, the usual auxiliaries can be added, examples being peroxide initiators, suspension stabilizers, blowing agents, chain-transfer agents, expansion aids, nucleating agents and plasticizers. The quantities of the flame retardant of the invention added in the polymerization are usually from 0.3 to 10% by weight, preferably from 0.5 to 5% by weight, based on monomer. Quantities of blowing agents added are from 2 to 10% by weight, based on monomer. They can be added before, during or after polymerization of the suspension. Examples of suitable blowing agents are aliphatic hydrocarbons having from 4 to 6 carbon atoms. It is advantageous to use inorganic Pickering dispersants as suspension stabilizers, an example being magnesium pyrophosphate or calcium phosphate.

The suspension polymerization produces bead-shaped, substantially round particles with average diameter in the range from 0.2 to 2 mm.

The finished expandable styrene polymer pellets can be coated with glycerol esters, antistatic agents or anticaking agents in order to improve processability.

The EPS pellets can be coated with glycerol monostearate GMS (typically 0.25 part by weight), glycerol tristearate (typically 0.25 part by weight), Aerosil R972 fine-particle silica (typically 0.12 part by weight) or Zn stearate (typically 0.15 part by weight), or else with antistatic agent.

The expandable styrene polymer pellets of the invention can be prefoamed in a first step by means of hot air or of steam to give foam beads with density in the range from 5 to 200 kg/m$^3$, in particular from 10 to 50 kg/m$^3$, and can be fused in a second step in a closed mold to give molded foams.

The expandable polystyrene particles can be processed to give polystyrene foams with densities of from 8 to 200 kg/m$^3$, preferably from 10 to 50 kg/m$^3$. To this end, the expandable particles are prefoamed. This is mostly achieved by heating the particles with steam in what are known as prefoamers. The particles thus prefoamed are then fused to give moldings. To this end, the prefoamed particles are introduced into molds which are not gas-tight when closed, and are exposed to steam. The moldings can be removed after cooling.

In another preferred embodiment, the foam is an extruded polystyrene (XPS) obtainable by:
(s1) heating of the thermoplastic matrix polymer, in particular vinylaromatic homo- or copolymer, to form a polymer melt,
(s2) introduction of a blowing agent component into the polymer melt to form a foamable melt,
(s3) extrusion of the foamable melt into a region of relatively low pressure, with foaming to give an extruded foam and
(s4) addition of the flame retardant of the invention, and also optionally of other additives, in at least one of the steps (s1) and/or (s2).

The foams of the invention, in particular those based on styrene polymers, for example EPS and XPS, are suitable by way of example for use as insulation materials, in particular in the construction industry.

The extinguishment time (fire test B2 in accordance with DIN 4102 or EN 11925-2 with foam density 15 g/l and storage time 72 h) of foams of the invention, in particular those based on styrene polymers, for example EPS and XPS, is preferably ≤15 sec, particularly preferably ≤10 sec, and they therefore comply with the conditions required to pass the fire test mentioned, as long as flame height does not exceed the test mark stated in the standard.

The examples and claims below provide further explanation of the invention.

EXAMPLES

Test Methods

Weight-average molar masses $M_w$ were measured by means of gel permeation chromatography (GPC) in accordance with ISO 16014-3:2012 on Mixed B polystyrene gel columns from Polymer Labs., using monodisperse polystyrene standards, at room temperature and with tetrahydrofuran as eluent at 20° C. The correct molar mass $\underline{M}_w$ of the polybutadiene is determined by mixed calibration:
$M_w(GPC)=M_{W\ absolute}(PS\ content)+M_{W\ absolute}(butadiene\ content)\times 1.72$ The 1,2-vinyl content was determined by FT-IR spectroscopy.

Production of SBC Block Copolymers

Linear styrene-butadiene triblock copolymers of table 1 (inventive examples 1, 2, 3A and 3B, and also comparative example 1 (CE1)) were obtained by sequential anionic polymerization of styrene and butadiene in accordance with the procedure below. The quantities of the reagents of table 2 used in the production process were those stated.

A 10 liter reactor vessel comprising cyclohexane and a few ml of BuLi was stirred overnight. Fresh cyclohexane/THF was then charged to the vessel, 1 ml of 1,1-diphenylethylene was added, and the mixture was titrated at 40° C. until a permanent weak red coloration was obtained. The initiator (1.4 molar sec-BuLi in cyclohexane) and the respective monomer (in the sequence stated in table 1) were then added at a temperature of from 55 to 65° C., and in each case the mixture was polymerized to complete conversion (after 15 minutes). The internal temperature of the reactor vessel was adjusted or maintained by way of the water in the jacket. Isopropanol was then used for termination. The contents of the vessel were discharged into two 5 liter canisters (flushed with nitrogen), and water and dry ice were admixed (1.0% of $CO_2$+0.5% of $H_2O$, based on solids), and the mixture was vigorously shaken.

After 5 min, the stabilizer solution (0.2% of Sumilizer® GS+0.2% Irganox® 1010, based on solids) was added in the form of 10% toluene solution, and the mixture was again shaken.

The cyclohexane used, and the THF, were dried in advance at room temperature over aluminum oxide beads; the butadiene was in advance at −10° C. over aluminum oxide beads (in each case drying for one day). The styrene derives directly from styrene distillation at the styrene plant, and was used without further purification.

TABLE 1

Block make-up (proportions in % by weight) of linear styrene-butadiene block copolymers

| Example | Linear structure | S1 Mw [g/mol] | B Mw [g/mol] | S2 Mw [g/mol] | S3 Mw [g/mol] | n [mol] | BD total [%] | Mw (theoretical) [g/mol] | Mw (GPC) PS calibration |
|---|---|---|---|---|---|---|---|---|---|
| CE1 | S2-B-S2 | 23 000 | 94 000 | 23 000 | | | 67 | 140 000 | 215 000 |
| 1 | S1-B-S2 | 80 000 | 80 000 | 20 000 | | | 44 | 180 000 | 245 000 |
| 2 | S1-B-S2 | 120 000 | 120 000 | 30 000 | | | 44 | 270 000 | 370 000 |
| 3A | S1-S2-B-S3 | 100 000 | 120 000 | 20 000 | 20 000 | 1 | 46 | 260 000 | |
| 3B | S2-B-S3 | 0 | 120 000 | 20 000 | 20 000 | 2 | 75 | 160 000 | |
| 3 | | | | | | | 62.1 | 193 333 | 290 000 |

Inventive example 3 is a mixture of the linear SBC block copolymers 3A (of the invention) and 3B (not of the invention) in the molar ratios of table 1.

The block designated as A in the description corresponds to the polystyrene blocks S2 and S3; polystyrene block S is formed from the blocks S1 and S2; B is a polybutadiene block or the unbrominated precursor of the block BB; BD states the butadiene content of the block copolymer. BD in the case of example 3 is the average value of the butadiene content of the mixture.

The 1,2-vinyl content, determined by means of $^1$H NMR, of the butadiene units in the block copolymers was in each case 72%.

TABLE 2

Reagents used for sequential anionic polymerization

| Example | Measurement unit | Cyclohexane | THF | BuLi | S1 | B | S2 | S3 | Initiator ratio | Edenol® D82 | Isopropanol |
|---|---|---|---|---|---|---|---|---|---|---|---|
| CE1 | | | | | | | | | — | | mmol |
| | $M_w$ [g/mol] | | | | 23 000 | 94 000 | 23 000 | | | | BuLi × 1.5 |
| | mmol | | | 11.43 | | | | | | | |
| | [g] | 3546 | 186 | | 264 | 1072 | 264 | | | | |
| | [ml] | 4547 | 209 | 8.16 | 290 | 1637 | 290 | | | | 0.88 |
| | [%] | | | | 16.5 | 67 | 16.5 | | | | |
| 1 | $M_w$ [g/mol] | | | | 8 0000 | 80 000 | 20 000 | | — | | |
| | mmol | | | 8.89 | | | | | | | |
| | [g] | 3546 | 186 | | 704 | 704 | 192 | | | | |
| | [ml] | 4547 | 209 | 6.35 | 778 | 1075 | 212 | | | | 0.68 |
| | [%] | | | | 44 | 44 | 12 | | | | |
| 2 | $M_w$ [g/mol] | | | | 120 000 | 120 000 | 30 000 | | — | | |
| | mmol | | | 5.93 | | | | | | | |
| | [g] | 3546 | 186 | | 704 | 704 | 192 | | | | |
| | [ml] | 4547 | 209 | 4.23 | 778 | 1075 | 212 | | | | 0.46 |
| | [%] | | | | 44 | 44 | 12 | | | | |
| 3A | $M_w$ [g/mol] | | | | 100 000 | 120 000 | 20 000 | 20 000 | 1 to 2 | | |
| | mmol | | | 2.76 | | | | — | | | |
| | [g] | 3546 | 186 | | 275 | 993.6 | 165.7 | 165.7 | | | |
| | [ml] | 4547 | 209 | 1.97 | 304 | 1517 | 183 | 183 | | | |
| | [%] | | | | 17.19 | 62.1 | 10.36 | 10.36 | | | |
| 3B | $M_w$ [g/mol] | | | | 0 | 120 000 | 20 000 | 20 000 | | | |
| | mmol | | | 5.52 | | | | | | | |
| | [g] | | | | | | | | | | |
| | [ml] | | | 3.94 | | | | | | | 0.64 |
| | [%] | | | | | | | | | | |
| | Total BuLi | | | 8.28 | | | | | | | |
| 4 S1-S2-B~ | $M_w$ [g/mol] | | | | 100 000 | 60 000 | 20 000 | | 1 to 3 | | |
| | mmol | | | 3.81 | | | | — | | | |
| | [g] | 3546 | 186 | | 381 | 914.3 | 304.7 | | | | |
| | [ml] | 4547 | 209 | 2.72 | 421 | 1396 | 337 | | | | |
| | [%] | | | | 23.81 | 57.14 | 19.04 | | | | |
| S2-B~ | $M_w$ [g/mol] | | | | 0 | 60 000 | 20 000 | | | | |
| | mmol | | | 11.43 | | | | | | | |
| | [g] | | | | | | | | | | |
| | [ml] | | | 8.16 | | | | | | 0.95 | 1.17 |
| | [%] | | | | | | | | | | |
| | Total BuLi | | | 15.24 | | | | | | | |
| 5 S1-S2-B~ | $M_w$ [g/mol] | | | | 100 000 | 80 000 | 20 000 | | 1 to 3 | | |
| | mmol | | | 3.20 | | | | — | | | |
| | [g] | 3546 | 186 | | 320 | 1024 | 256 | | | | |
| | [ml] | 4547 | 209 | 2.29 | 354 | 1563 | 282 | | | | |
| | [%] | | | | 20.0 | 64.0 | 16.0 | | | | |
| S2-B~ | $M_w$ [g/mol] | | | | 0 | 80 000 | 20 000 | | | | |
| | mmol | | | 9.60 | | | | | | | |
| | [g] | | | | | | | | | | |
| | [ml] | | | 6.86 | | | | | | 0.80 | 0.99 |
| | [%] | | | | | | | | | | |
| | Total BuLi | | | 12.80 | | | | | | | |

Star-shaped styrene-butadiene block copolymers of the structure [(S1-S2-B~)$_1$ (S2-B~)$_3$]-Z were obtained by sequential anionic polymerization of styrene and butadiene in accordance with the above procedure, where however monomer addition took place in the sequence of table 3 and after polymerization had ended epoxidized linseed oil (Edenol®D82 from BASF SE (previously Cognis)) was first used for coupling and then isopropanol was used for termination. The production process used the reagents of table 2 in the quantities stated.

Table 3 shows the block make-up of the individual star branches of the resultant asymmetrical star-shaped triblock copolymers of inventive examples 4 and 5.

TABLE 3

Block make-up (proportions in % by weight) of the individual star branches

| Example | Star branch structure | S1 Mw [g/mol] | B Mw [g/mol] | S2 Mw [g/mol] | n | BD total [%] | Mw** [g/mol] | Mw(GPC)*** PS calibration |
|---|---|---|---|---|---|---|---|---|
| 4 | S1-S2-B~ | 100 000 | 60 000 | 20 000 | 1 | 33 | 180 000 | |
|   | S2-B~    | 0       | 60 000 | 20 000 | 3 | 75 | 80 000  | |
| 4* |        |         |        |        |   | 57.1 | 105 000 | 310 000 |
| 5 | S1-S2-B~ | 100 000 | 80 000 | 20 000 | 1 | 40 | 200 000 | |
|   | S2-B~    | 0       | 80 000 | 20 000 | 3 | 80 | 100 000 | |
| 5* |        |         |        |        |   | 64.0 | 125 000 | 380 000 |

*Average value;
**Mw(theoretical) before coupling;
***Mw(GPC) value after coupling The block designated as A in the description corresponds to the polystyrene block S2; polystyrene block S is formed from the blocks S1 and S2; B is a polybutadiene block or the unbrominated precursor of the block BB; BD states the butadiene content of the respective star branches of the block copolymer, and n is the number of the respective star branches.

The 1,2-vinyl content, determined by means of $^1$H NMR, of the butadiene units in the block copolymers was in each case 72%.

The stated molar mass Mw is the molar mass of the star branches before coupling. Because the star polymers obtained after coupling are a stochastic mixture of star polymers with a different number of branches, the coupling yield is only about 70%, and the (coupled) star polymers have reduced hydrodynamic volume in comparison with the individual star branches, the molar mass of the (coupled) star-shaped block copolymer is obtained, on the basis of empirical experience, by the following calculation:

$$Mw(\text{coupled}) = Mw(\text{before coupling}) \times 2.1,$$

Production of Br-SBC Block Copolymer

General Description:

30 g of the respective SBC block copolymer are dissolved in 350 ml of methylene chloride in a 2 l round-bottomed flask with reflux condenser, stirrer and nitrogen blanketing. Tetrabutylammonium tribromide (TBAT; Sigma Aldrich) is added as brominating agent. The molar quantity of the TBAT is matched to the molar quantity of the butadiene units (1:1 stoichiometry). A water bath is used to keep the mixture at reflux for 6 h. After cooling to room temperature, 200 ml of toluene, and then 300 ml of water, are added. The water phase is separated off, and the organic phase is washed with 300 ml of a 25% (w/w) sodium chloride solution which additionally comprises 3 g of sodium hydrogen sulfite. The Br-SBC block copolymer is precipitated by introducing the organic solution into five times the volume of methanol. The precipitated Br-SBC block copolymer is isolated by filtration and dried in vacuo at 50° C. to constant weight.

The bromine content of the resultant Br-SBC copolymers (see table 4) was determined by means of elemental analysis (TE Instruments Xplorer).

TABLE 4

Bromine content of the resultant Br-SBC block copolymers.

| Example | SBC block copolymer | Bromine content of Br-SBC block copolymer in % (w/w) |
|---|---|---|
| CE6 | CE1 | 65 |
| 7 | 1 | 55 |
| 8 | 2 | 55 |

TABLE 4-continued

Bromine content of the resultant Br-SBC block copolymers.

| Example | SBC block copolymer | Bromine content of Br-SBC block copolymer in % (w/w) |
|---|---|---|
| 9 | 3 | 65 |
| 10 | 4* | 65 |
| 11 | 5* | 67 |

Production of Polymer Compositions

The respective polymer composition (see inventive examples 13 to 17, and also CE12) are produced by dissolving 2.6 g of benzoyl peroxide (Perkadox® L-W75 from Akzo Nobel) and 19.9 g of dicumyl peroxide (Perkadox® BC-FF from Akzo Nobel) in 3700 g of styrene. The quantity stated in table 5 of Br-SBC block copolymer is added to this mixture. The aim is to obtain an identical bromine content in all of the polymer compositions. This organic phase is introduced into 4380 g of deionized water in a 10 l stirred vessel. The aqueous phase also comprises 8.1 g of magnesium pyrophosphate (produced from sodium pyrophosphate and magnesium sulfate). The mixture is heated, with stirring, to 104° C. for the period of 1.75 h and then to 136° C. for the period of 5.5 h. 1.8 h after the temperature had reached 80° C., 18 g of a 2% solution of E30 emulsifier (Mersolat® H40 from Lanxess) are added to the mixture. After one further hour, 270 g of pentane (Exxsol® Pentane 80 from ExxonMobil) are added thereto. Polymerization is then completed for a further 1 h at the final temperature of 136° C. The resultant polymer composition is isolated by decanting and dried.

The resultant polymer beads are then coated with 0.3% (w/w) of a mixture of 60% (w/w) of glycerol tristearate (Softenol® 3168 from 101 Oleo), 30% (w/w) of glycerol monostearate (Softenol® 3995 from 101 Oleo) and 10% (w/w) of zinc stearate (Zincum® 5 from Baerlocher).

The weight-average molecular weight Mw of the polymer composition is determined by means of GPC.

TABLE 5

Formulations and results of the experiments for the production of the polymer composition

| Example | Br-SBC block copolymer | Quantity of Br-SBC block copolymer in g | Mw of polymer composition in g/mol |
|---|---|---|---|
| CE12 | CE6 | 25.0 | 182 000 |
| 13 | 7 | 29.5 | 178 000 |
| 14 | 8 | 29.5 | 175 000 |
| 15 | 9 | 25.0 | 184 000 |
| 16 | 10 | 25.0 | 172 000 |
| 17 | 11 | 24.3 | 186 000 |

Production of Foam

The polymer beads comprising blowing agent of inventive examples 13 to 17, and also CE1, were prefoamed by exposure to a current of steam and after storage for 12 h were fused in a closed mold by further steam treatment to give foam blocks with density about 15 kg/m$^3$.

Fire behavior was determined after conditioning in accordance with EN 13238, on samples of thickness 20 mm in accordance with EN 11925-2, with edge flame application for 15 s.

The thermal conductivity of the samples was determined in accordance with EN 12667.

Average cell size was determined by microscopic measurement.

Table 6 collates the results.

TABLE 6

Results of analysis of the foam samples

| Example | Density in kg/m$^3$ | Fire class in accordance with EN 13501-1 | Thermal conductivity in mW/(m*K) | Average cell size in μm |
|---|---|---|---|---|
| CE12 | 15.1 | E | 39.2 | 90 |
| 13 | 14.8 | E | 38.2 | 170 |
| 14 | 15.2 | E | 37.6 | 160 |
| 15 | 14.8 | E | 38.0 | 190 |
| 16 | 15.2 | E | 37.7 | 150 |
| 17 | 14.9 | E | 37.9 | 160 |

The low cell size in comparative example CE12 reveals the nucleating effect of a Br-SBC triblock copolymer of the prior art in comparison with the Br-SBC block copolymers of the invention (inventive examples 13 to 17).

The inventive examples analogously reveal significantly better (lower) thermal conductivity values.

The invention claimed is:

1. A brominated vinylaromatic-diene block copolymer (Br-SBC) comprising at least one vinylaromatic polymer block S and at least one brominated diene polymer block BB,
    wherein
        before bromination the weight-average molar mass $M_w$ of the block S is greater than or equal to $M_w$ of the block BB;
        the molar mass $M_w$ of the block BB (before bromination) is from 50000 to 130 000 g/mol; and
        the molar mass $M_w$ of the block S is from 60000 to 300000 g/mol;
    wherein the molar mass $M_w$ is determined by means of GPC in accordance with ISO 16014-3:2012 (relative to polystyrene standards at 25° C. in THF) before bromination and
    wherein the block copolymer has a linear structure of the formula K-S-BB-A (Ia), in which K is absent or K and A, respectively mutually independently, are a vinylaromatic (co)polymer block different from S and BB; and the molar mass $M_w$ of the blocks K and A is respectively smaller than the molar mass $M_w$ of the block BB; or
    the block copolymer has a star-shaped structure of the formula $$Z\text{---}[(P)_p(Q)_q(R)_r]_m \qquad (Ib),$$

in which
        Z is a moeiety of a polyfunctional coupling agent or initiator;
        P, Q, R . . . are various star branches, where
        star branch P has the structure ~BB-S or ~A-BB-S; and the star branches Q and R mutually independently have the structure ~A-BB, ~S, ~BB, and/or ~BB-A;
        in which ~ is the location of bonding to the moiety Z, and A is a vinylaromatic (co)polymer block which differs from S and BB and has a molar mass $M_w$ smaller than $M_w$ of the block BB;
        p is 1 or 2,
        q and r are independently natural numbers greater than 0; and
        m is the total number of star branches or the sum of the indices p, q, r . . . , where m is a natural number from 3 to 10;
    wherein the molar mass $M_w$ of the blocks K and A—mutually independently—is in the range from 15000 to 35000 g/mol.

2. The brominated vinylaromatic-diene block copolymer according to claim 1, in which the block A and/or the block K is a polystyrene block.

3. The brominated vinylaromatic-diene block copolymer according to claim 1, in which K is absent.

4. The brominated vinylaromatic-diene block copolymer according to claim 1, in which P=~BB-S, Q=~BB-A, r=0, m=from 3 to 10 and A is a vinylaromatic (co)polymer block.

5. A mixture comprising
    α) at least one linear brominated vinylaromatic-diene block (co)polymer according to claim 1, and
    β) at least one other brominated diene/vinylaromatic copolymer different therefrom, in particular Br-SBC block copolymer,
    comprising at least one brominated diene polymer block BB, at least one vinylaromatic polymer block A and no vinylaromatic polymer block S, where A, S and BB are defined as above, and the molar mass $M_w$ of the block A is respectively smaller than $M_w$ of the block BB; or
a mixture comprising
    α) at least one brominated vinylaromatic-diene block (co)polymer according to claim 1, and
    β) at least one other brominated diene/vinylaromatic copolymer different therefrom, in particular Br-SBC block copolymer, as described before, and
    γ) at least one brominated polybutadiene homopolymer (Br-PBD), the weight-average molar mass $M_w$ of which—before bromination—is smaller than or equal to $M_w$ of the block BB.

6. The mixture according to claim 5, in which γ) is absent and β) is a linear Br-SBC of the structure H-BB-A (Ic), in which H is a vinylaromatic polymer block, and the molar mass $M_w$ (or block length) of the block H is smaller than $M_w$ of the block BB.

7. A process for the production of brominated vinylaromatic-diene block copolymer according to claim 1, comprising steps a) to d):
   a) production of at least one linear or star-shaped vinylaromatic-diene block copolymer (SBC) comprising at least one vinylaromatic polymer block S and at least one diene polymer block B (=unbrominated precursor of the block BB) by sequential anionic polymerization, where the weight-average molar mass $M_w$ of the block S is greater than or equal to $M_w$ of the block BB;
   b) provision of a homogeneous reaction solution comprising the SBC obtained in step a), at least one brominating agent and at least one solvent;
   c) bromination of more than 50% of the nonaromatic double bonds of the SBC block copolymer, based on the nonaromatic double bond content of the SBC block copolymer before bromination; and
   d) isolation of the Br-SBC block copolymer obtained in step c).

8. The use of the brominated vinylaromatic-diene block copolymer according to claim 1 as flame retardant.

9. A polymer composition comprising at least one unfoamed or foamed thermoplastic polymer and at least one brominated vinylaromatic-diene block copolymer according claim 1 as flame retardant.

10. The polymer composition according to claim 9, in which unfoamed or foamed thermoplastic polymer used comprises a vinylaromatic homo- or copolymer, and the molar mass $M_w$ of the S-block of the brominated vinylaromatic-diene block copolymer is from 30 to 70% by weight of the weight-average molar mass $M_w$ of the vinylaromatic homo- or copolymer.

11. An expanded or extruded foam made of the polymer composition according to claim 9.

12. The use of the foam according to claim 11 as insulation material.

* * * * *